US008799870B2

(12) United States Patent
MacLellan et al.

(10) Patent No.: US 8,799,870 B2
(45) Date of Patent: Aug. 5, 2014

(54) METHOD SYSTEM AND COMPUTER PROGRAM FOR METERING USAGE OF SOFTWARE PRODUCTS BASED ON REAL-TIME BENCHMARKING OF PROCESSING POWER

(75) Inventors: Scot MacLellan, Rome (IT); Roberto Mulatti, Rome (IT); Antonio Perrone, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1464 days.

(21) Appl. No.: 12/377,413

(22) PCT Filed: Oct. 25, 2006

(86) PCT No.: PCT/EP2006/067744
§ 371 (c)(1),
(2), (4) Date: Feb. 13, 2009

(87) PCT Pub. No.: WO2007/068524
PCT Pub. Date: Jun. 21, 2007

(65) Prior Publication Data
US 2010/0218170 A1 Aug. 26, 2010

(30) Foreign Application Priority Data

Dec. 16, 2005 (EP) ..................................... 05112286

(51) Int. Cl.
*G06F 9/44* (2006.01)

(52) U.S. Cl.
USPC ....................................................... 717/127

(58) Field of Classification Search
USPC ....................................................... 717/127
See application file for complete search history.

(56) References Cited

U.S. PATENT DOCUMENTS 6,463,457 B1 * 10/2002 Armentrout et al. .......... 709/201

7,546,598 B2 * 6/2009 Blumenthal et al. .............. 718/1
(Continued)

FOREIGN PATENT DOCUMENTS

| JP | 1152545 | 6/1989 |
| JP | 7160545 A | 6/1995 |

(Continued)

OTHER PUBLICATIONS

Kazuyuki Shudo et al., "Efficient Implementation of Strict Floating-Point Semantics", Journal, 2000, pp. 99-105, Waseda University, Tokyo, Japan.

*Primary Examiner* — Li B Chen
*Assistant Examiner* — Arshia S Kia
(74) *Attorney, Agent, or Firm* — Brevetto Law Group

(57) ABSTRACT

A solution (300) for metering usage of software products on a data processing system is proposed. In this context, it is often necessary to known a processing power of each computer wherein a generic software product ran (for example, for licensing accounting based on differentiated charging rates). In the proposed solution, the processing power is estimated dynamically on the computer directly. For this purpose, a (single-threaded) benchmark program written in a low-level language is executed (308-322), such as at the startup or periodically. In this way, dividing (324) the measured execution time of the benchmark program by the known number of its instructions it is possible to determine an execution rate of a single microprocessor of the computer. This value multiplied (326) by the detected (306; 332) number of available microprocessors provides an accurate estimate of the processing power of the computer. The desired result is achieved without requiring any knowledge of the physical details of the computer; this is particularly advantageous when the computer consists of a logical guest machine implemented on a physical host machine.

23 Claims, 5 Drawing Sheets

(56) References Cited

U.S. PATENT DOCUMENTS

| | | | |
|---|---|---|---|
| 7,849,449 B2* | 12/2010 | Andrade et al. | 717/127 |
| 2002/0062288 A1* | 5/2002 | Ooishi | 705/52 |
| 2002/0083003 A1* | 6/2002 | Halliday et al. | 705/52 |
| 2003/0135474 A1* | 7/2003 | Circenis et al. | 705/400 |
| 2005/0138422 A1* | 6/2005 | Hancock et al. | 713/201 |
| 2006/0080523 A1* | 4/2006 | Cepulis | 713/100 |
| 2006/0095902 A1* | 5/2006 | Nakaike et al. | 717/158 |
| 2006/0179136 A1* | 8/2006 | Loboz et al. | 709/224 |
| 2006/0265713 A1* | 11/2006 | Depro et al. | 718/104 |
| 2007/0043672 A1* | 2/2007 | Martin et al. | 705/51 |
| 2007/0139014 A1* | 6/2007 | Girson et al. | 320/132 |
| 2007/0157177 A1* | 7/2007 | Bouguet et al. | 717/128 |
| 2009/0037572 A1* | 2/2009 | Gebhart et al. | 709/224 |
| 2009/0328008 A1* | 12/2009 | Mital et al. | 717/129 |

FOREIGN PATENT DOCUMENTS

| | | | |
|---|---|---|---|
| JP | 20022157186 A | | 5/2002 |
| JP | 2002244890 | | 8/2002 |
| JP | 2002323984 A | | 11/2002 |
| JP | 2002351566 | | 12/2002 |
| JP | 2003030007 A | | 1/2003 |
| JP | 2003507812 A | | 2/2003 |
| JP | 2004094978 | | 3/2004 |
| JP | 2005085164 A | | 3/2005 |
| JP | 2005157186 | | 6/2005 |
| JP | 2005327261 A | | 11/2005 |
| WO | 0114961 A2 | | 3/2001 |
| WO | 0114961 A2 | | 2/2003 |

\* cited by examiner

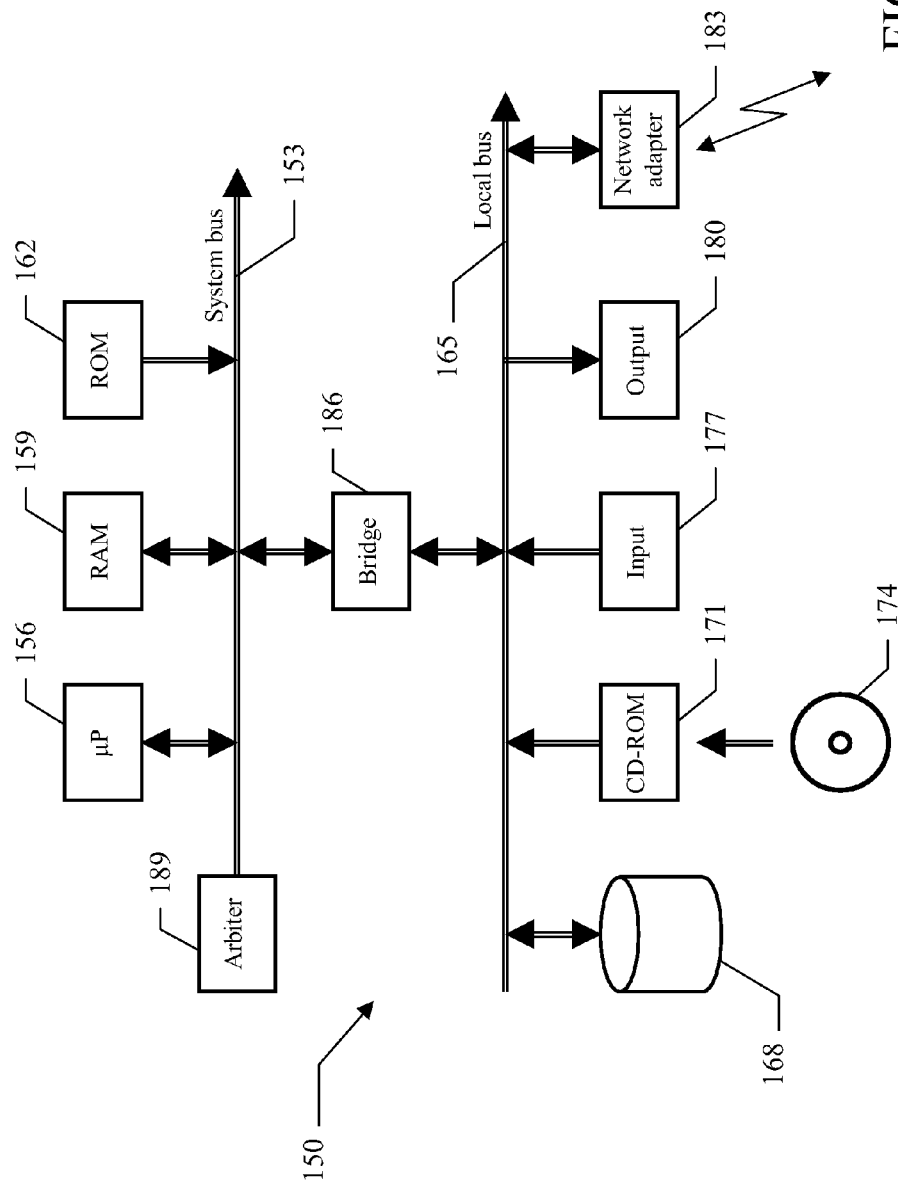

METHOD SYSTEM AND COMPUTER PROGRAM FOR METERING USAGE OF SOFTWARE PRODUCTS BASED ON REAL-TIME BENCHMARKING OF PROCESSING POWER

FIELD OF THE INVENTION

The present invention relates to the information technology field. More specifically, the invention relates to the metering of usage of software products on a data processing system.

BACKGROUND ART

Metering the usage of software products in a data processing system is of the utmost importance in several management applications. A typical example consists of a license management infrastructure, which is used to control the running of known software products on the system; an example of commercial license management infrastructure available on the market is based on the "IBM Tivoli License Manager (ITLM)" application by IBM Corporation.

The information so obtained about the usage of the software products is generally exploited for charge-back accounting (according to corresponding conditions of use). In this context, a recent trend in licensing strategies is of varying the charging rate of the software products according to the hardware configuration of the systems where they run, for example, increasing it with the number of (micro)processors available. However, a limitation of this model is that all the microprocessors are assumed to be equivalent from a pricing point of view (so that no difference exists between the use of the software products on low-end and high-end systems). This strategy leads to undercharging on high-end systems; vice-versa, it inhibits the use of the same software products on low-end systems (where there would be the perception of overcharging).

In order to solve the above-mentioned problem, it has been proposed to classify the microprocessors according to their processing power; in this way, it would be possible to discriminate the usage of the software products on different systems (so as to apply corresponding charging rates, typically increasing with the processing power).

However, the implementation of the above-described mechanism is decidedly nontrivial. Indeed, first of all it is necessary to establish a standard benchmark for weighting the microprocessors (so as to allow associating the correct charging rates). Moreover, a catalogue of all the existing microprocessor types (with their weights) must be available to the licensing application; this also imposes the burden of keeping the catalogue constantly up-to-date.

In any case, technical difficulties are experienced whenever the system does not consist of a real computer. For example, the system may be implemented by a logical partition of a (physical) host machine; those solutions are becoming more and more popular, since they allow simulating a high number of (logical) guest machines that are very easy to maintain (without requiring the proliferation of different real computers). However, very often in this condition the system does not have the possibility of gathering the configuration information that is required by the licensing application (for example, the number and type of microprocessors); indeed, this information may be hidden to the guest machines, because of either a deliberate design choice or an intrinsic limitation of the environment.

SUMMARY OF THE INVENTION

The present invention provides a solution as set out in the independent claims. Advantageous embodiments of the invention are described in the dependent claims.

In principle, the invention is based on the idea of measuring the processing power of the system dynamically.

Particularly, an aspect of the invention proposes a method for metering usage of software products on a data processing system. The method starts with the step of measuring a running index indicative of the running of each one of a set of predefined software products on the system (such as their running period). Usage of each software product is then determined according to the corresponding running index and a processing power of the system. For this purpose, a benchmark program is executed on the system; the benchmark program performs a predetermined number of instructions. The method continues by determining an indication of an execution time of the benchmark program. The processing power can now be calculated according to the execution time and the number of instructions.

In an embodiment of the invention, the execution time of the benchmark program (non-interruptable) is determined by recording its starting time and ending time, and then calculating their difference.

In another embodiment, the same result is achieved by retrieving the time dedicated by a processor of the system to a corresponding process (such as from the operating system).

Typically, the benchmark program is written in a low-level language (for example, the assembler).

A suggested choice is of launching the execution of the benchmark program when the system is started-up.

When the proposed solution is implemented on a multiprocessor system, the processing power determined by the benchmark program (single-threaded) is multiplied by the number of processors.

In this context, a way to further improve the solution is of recalculating the processing power only when a change in the number of processors is detected.

Advantageously, the proposed solution is applied on a (physical) host machine that implements multiple (logical) guest machines (wherein all the operations are carried out on a single guest machine).

Another aspect of the invention proposes a computer program for performing the method.

A further aspect of the invention proposes a corresponding system.

REFERENCE TO THE DRAWINGS

The invention itself, as well as further features and the advantages thereof, will be best understood with reference to the following detailed description, given purely by way of a non-restrictive indication, to be read in conjunction with the accompanying drawings, in which:

FIG. 1b shows the functional blocks of an exemplary computer of the system;

DETAILED DESCRIPTION

Figure 1A:
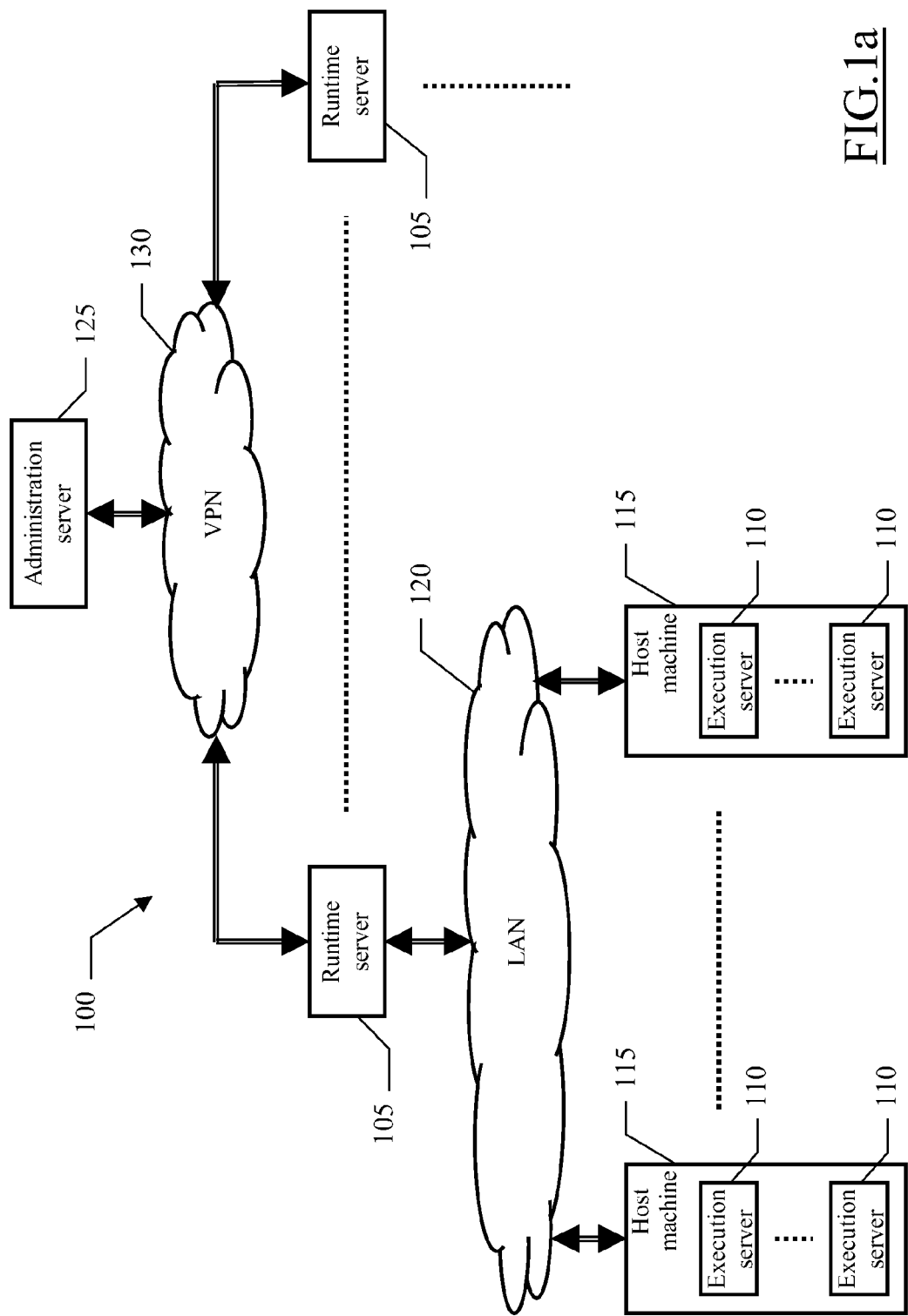
FIG. 1a is a schematic block diagram of a data processing system in which the solution according to an embodiment of the invention is applicable.

With reference in particular to FIG. 1a, a data processing system 100 with distributed architecture is depicted. The system 100 implements a license management infrastructure (for example, based on the above-mentioned ITLM), which allows metering the usage of selected software products (such as application programs). The system 100 includes one or more independent organizations (only one shown in the figure), which are completely separate and distinct from each other; within the organization, one or more divisions are defined.

Each division is formed by a runtime server 105, which directly controls the usage of assigned software products on a set of corresponding execution servers (or nodes) 110. The execution servers 110 may consist of logical guest machines that are implemented on physical host machines 115; each host machine 115 (such as of the "zSeries", "AS/400" or "Power5" type by IBM Corporation) supports one or more execution servers 110 (for example, by means of corresponding logical partitions). The runtime server 105 and all the execution servers 110 of the division communicate through a network 120 (for example, a LAN).

The different runtime servers 105 report to a single administration server 125, which implements a central control point for inventory, procurement, and accounting information of the whole organization; the runtime servers 105 and the administration server 125 are connected to a different network 130 (for example, a Virtual Private Network or VPN based on the Internet).

Considering now FIG. 1b, a generic computer of the above-described system (runtime server, host machine for the execution servers, or administration server) is denoted with 150. The computer 150 is formed by several units that are connected in parallel to a system bus 153 (with a structure that is suitably scaled according to the actual function of the computer 150 in the system). In detail, one or more (micro) processors (µP) 156 control operation of the computer 150; a RAM 159 is directly used as a working memory by the microprocessors 156, and a ROM 162 stores basic code for a bootstrap of the computer 150. Several peripheral units are clustered around a local bus 165 (by means of respective interfaces). Particularly, a mass storage consists of one or more hard-disks 168 and drives 171 for reading CD-ROMs 174. Moreover, the computer 150 includes input units 177 (for example, a keyboard and a mouse), and output units 180 (for example, a monitor and a printer). An adapter 183 is used to plug the computer 150 into the system. A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153.

Figure 2:
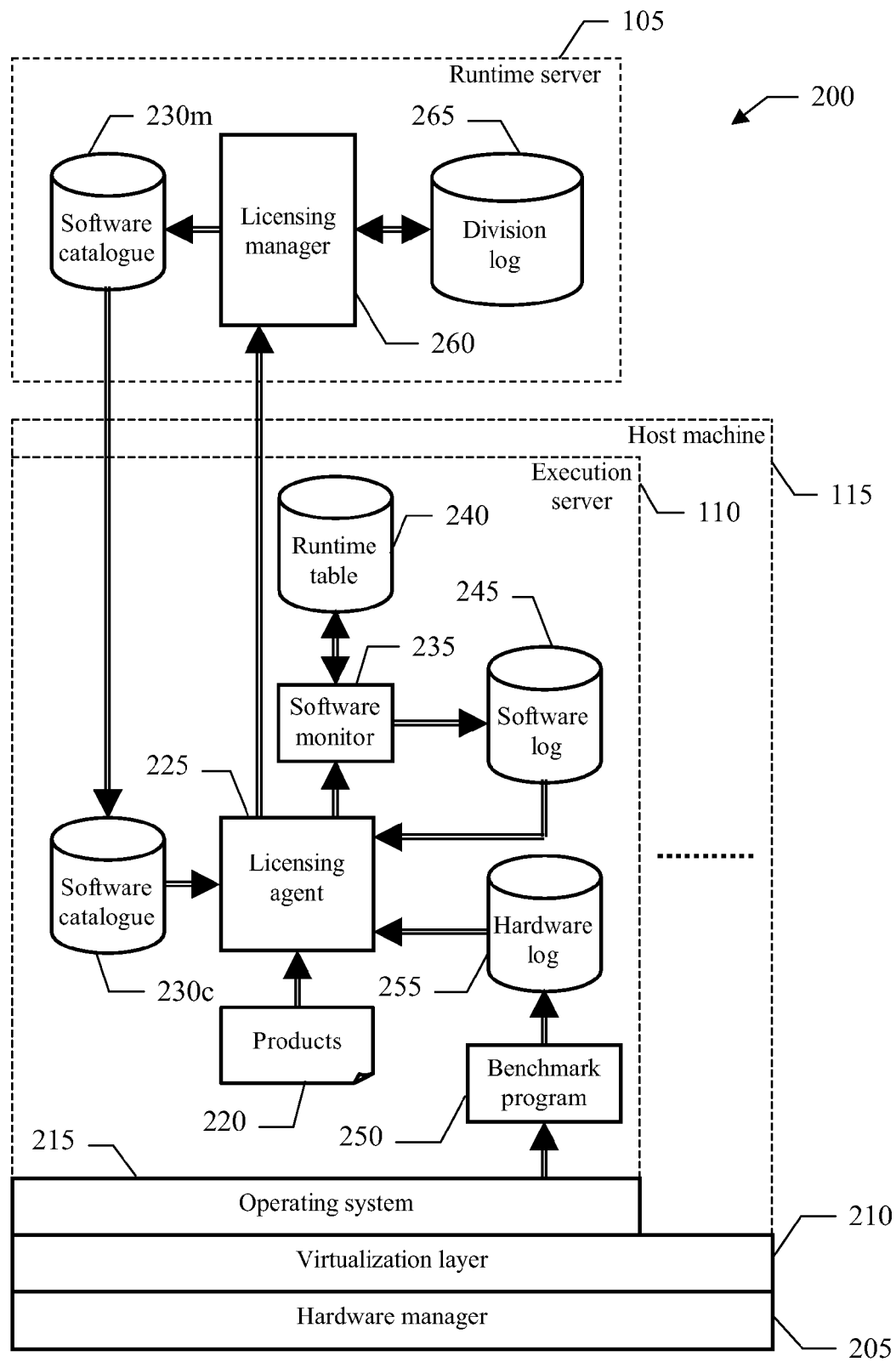
FIG. 2 depicts the main software components that can be used to practice the solution according to an embodiment of the invention.

Moving to FIG. 2, the main software components that run on the above-described system are denoted as a whole with the reference 200. The information (programs and data) is typically stored on the hard-disk and loaded (at least partially) into the working memory of each computer when the programs are running. The programs are initially installed onto the hard disk, for example, from CD-ROM.

Considering in particular a generic host machine 115, a manager 205 controls its hardware configuration; for this purpose, the hardware manager 205 provides a user interface, which is used to define the hardware resources that are available (such as the microprocessors, working memory, mass storage, peripheral units), to handle their addition, removal, set up, and the like. Generally, any change in the hardware configuration of the host machine 115 requires its restart (cold changes). However, the host machine 115 may also support warm changes, wherein the hardware configuration is updated without stopping its operation. For example, this is possible when the host machine 115 has been purchased with a Capacity on Demand (CoD) option. In this case, the host machine 115 includes more hardware resources (and especially microprocessors) than it is required for its standard use; a subset of the microprocessors is permanently available, while the remaining extra microprocessors are enabled on-demand only when they are actually needed (such as for some hours in response to a workload peak). Commercial products that support the CoD option are the "zSeries", "AS/400" and "Power5" computers by IBM Corporation.

A virtualization layer 210 simulates multiple guest machines, which implement the different execution servers 110 running on the host machine 115. Particularly, the virtualization layer 210 splits the host machine 115 into a plurality of Logical Partitions (LPARs). Each logical partition consists of a subset of the hardware resources of the host machine 115, which operates independently as a separate computer. Typically, when the host machine 105 implements the CoD option the hardware manager 205 assigns the microprocessors dynamically to each logical partition, up to a predefined maximum number; for example, if the host machine 115 includes 8 microprocessors and 4 logical partitions, it is possible to assign a maximum of 2 microprocessors to each logical partition (of course, until the total number of 8 is reached). Examples of commercial products that support the logical partitioning are the "zSeries" and "AS/400" computers by IBM Corporation.

With reference now to a generic execution server 110 defined on the host machine 115, a guest operating system 215 (such as the "zOS" by IBM Corporation or the "Linux") defines its software platform, on top of which any other program can run. As pointed out above, the operating system 215 works as if it was installed on a real computer (as simulated by the virtualization layer 210).

One or more software products 220 are installed on the execution server 110. A licensing agent 225 detects the software products 220 that are running on the execution server 110. For this purpose, the licensing agent 225 accesses a local copy of a software catalogue 230c that is downloaded from the runtime server 105 (for example, periodically or at any change thereof). The software catalogue 230c specifies all the known software products to be metered in the organization. Each software product is identified by a signature defined by one or more executable modules, which indicate the use of the software product when running; typically, each executable module is specified in the software catalogue 230c by means of multiple attributes (such as its name, size and checksum).

The licensing agent 225 supplies a list of the software products 220 currently running on the execution server 110 (including the available information about any unknown software product that has not been recognized) to a software monitor 235. The software monitor 235 accesses a runtime table 240, which provides a snapshot of the software products 220 in use on the execution server 115. In this way, the software monitor 235 can determine the software products 220 that have been started or stopped (since the last iteration of the operation). The information so obtained (together with a corresponding time-stamp) is added to a software log 245; at the same time, the runtime table 240 is updated accordingly.

In the solution according to an embodiment of the invention, a benchmark program 250 dynamically measures a processing power of the execution server 110. As described in detail in the following, for this purpose the benchmark program 250 is run and its execution time is measured. The benchmark program 250 performs a predetermined number of instructions; for example, this result is achieved by iterating a basic instruction (for example, an arithmetic operation) for a fixed number of times (such as with a loop). Therefore, it is possible to estimate the processing power of the execution server 100 according to its operation rate, which is calculated dividing the measured execution time of the benchmark program 250 by the known number of instructions.

The proposed solution strongly facilitates the determination of the processing power of the execution servers 110. Particularly, the desired result is achieved in real-time, without the need of maintaining any catalogue; moreover, the required information is gathered dynamically so that it always provides an accurate picture of the actual processing power of the execution servers 110.

In any case, the devised solution decouples the measurement of the processing power of the execution servers 110 from their physical details. More specifically, this technique does not require any knowledge of the actual structure of the execution servers 110. Therefore, it is not necessary to retrieve information about the hardware configuration of the execution servers 110 (such as the types of their microprocessors). This advantage is clearly apparent when the execution servers 110 do not consist of real computers, in which case it might be very difficult (if not impossible) to gather information about their hardware configuration. Therefore, the proposed solution is of general applicability irrespectively of the implementation of the execution servers 110.

Preferably, the benchmark program 250 is written in a low-level language (such as the assembler or the machine languages). The low-level languages only support a basic set of instructions, which correspond to the operations that can be executed by the microprocessors of the computer. In the machine language, the instructions consist of patterns of bits (machine code) that can be used to control operation of the microprocessors directly. On the other hand, in the assembler language the same instructions are represented with mnemonic symbols easier to read and write (which are converted into the corresponding machine code by an assembler). The low-level languages differ from the high-level languages, which support a richer set of instructions in the human format. For their executions, those instructions must be converted into corresponding streams of machine code (for example, statically by a compiler or dynamically by an interpreter); the compiler or the interpreter may generate the machine code either for a real computer or for a virtual machine hiding its actual implementation (such as the bytecode supported by the Java Run Time Environment). The choice of writing the benchmark program 250 in a low-level language ensures a good uniformity of the results that are obtained on heterogeneous execution servers 110, since it avoids any difference that may be introduced by the compilers or the interpreters.

Moreover, in the above-described multiprocessor environment (wherein the execution server 110 may include two or more microprocessors), the benchmark program 250 must be single-threaded; as a result, the benchmark program 250 is always executed on a single microprocessor, so as to provide an accurate estimate of its operation rate. In this case, the total processing power of the execution server 110 is obtained by multiplying the result so obtained by the number of its (identical) microprocessors.

For this purpose, the benchmark program 250 interfaces with the operating system 215 through specific Application Program Interfaces (APIs). The benchmark program 250 adds the estimated processing power of the execution server 110 (together with a corresponding time-stamp) to a hardware log 255.

The licensing agent 235 accesses both the software log 245 and the hardware log 255. The licensing agent 235 extracts the above-described software execution information from the software log 245 (i.e., the starting time and/or the stopping time of any software product 220) and the above-described hardware capacity information from the hardware log 255 (i.e., the processing power); this information is then transmitted to the runtime server 105 (together with an identifier of the execution server 110).

Considering now the runtime server 105, a licensing manager 260 receives the software execution information and the hardware capacity information of every execution server 110 in the division. The licensing manager 260 saves the different pieces of information into a (global) division log 265, and uploads it onto the administration server (not shown in the figure). Moreover, the licensing manager 260 also downloads a main copy of the software catalogue (denoted with 230*m*) from the same administration server (for example, periodically or at any change thereof).

Typically, the administration server aggregates the received information into a usage report. The usage report lists the software products that ran on the execution servers 110 in a predetermined period (such as the last day); for each software product, the usage report specifies the length of any running period on execution servers 110 with different processing power (i.e., on different execution servers 110 and/or on the same execution server 110 with different hardware configurations over time); for example, the usage report may indicate that a specific software product ran for 2 hours on an execution server 110 with 1 low-end microprocessor, for 1 hour on an execution server 110 with 1 high-end microprocessor, and for other 3 hours on the same execution server 110 but now with 2 high-end microprocessors. Generally, the usage report also points out any anomalous event occurred on the execution servers 110 of the organization (such as the use of unknown software products).

Figure 3A:
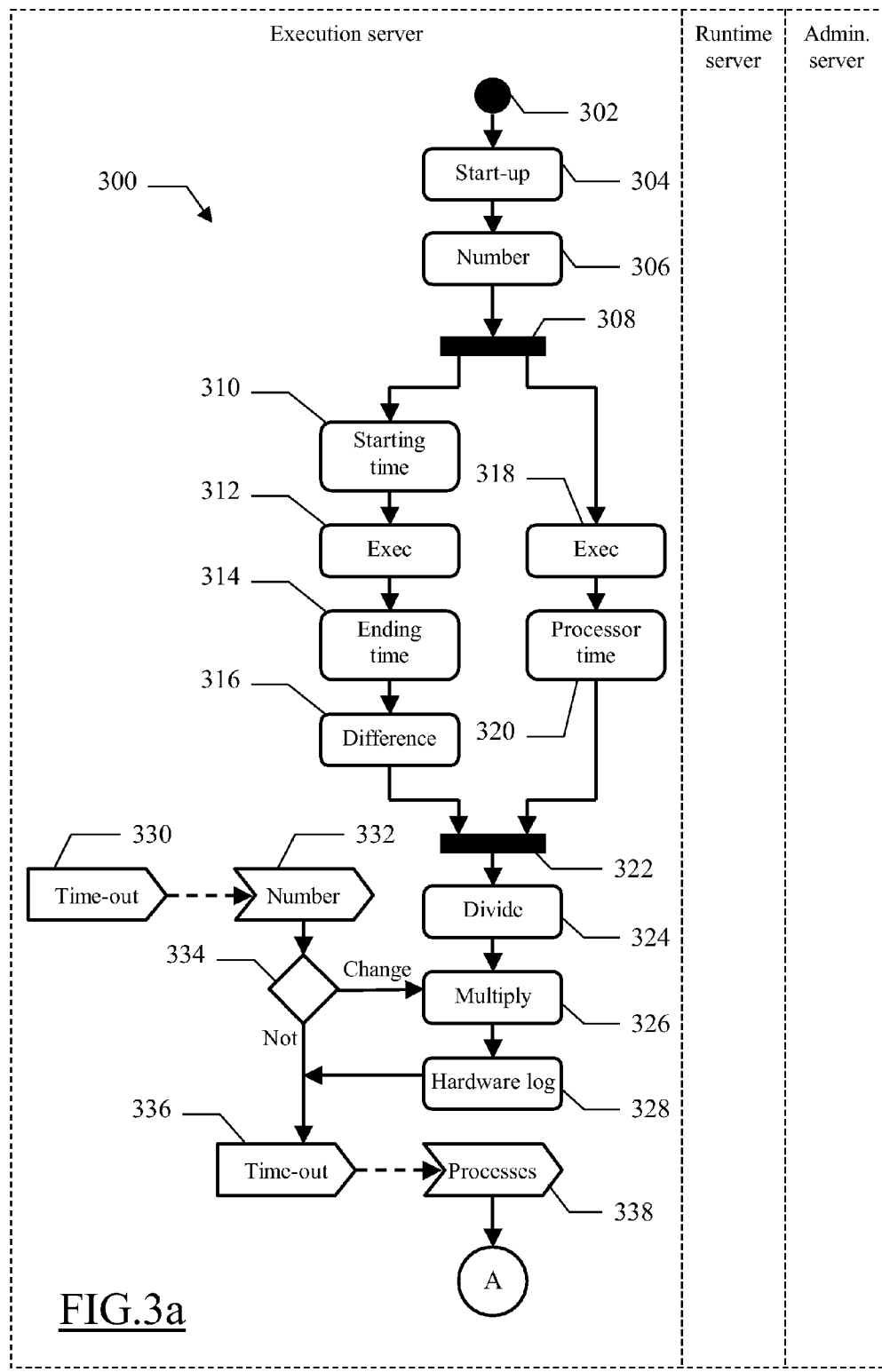
FIGS. 3a-3b show a diagram describing the flow of activities relating to an implementation of the solution according to an embodiment of the invention.
Figure 3B:
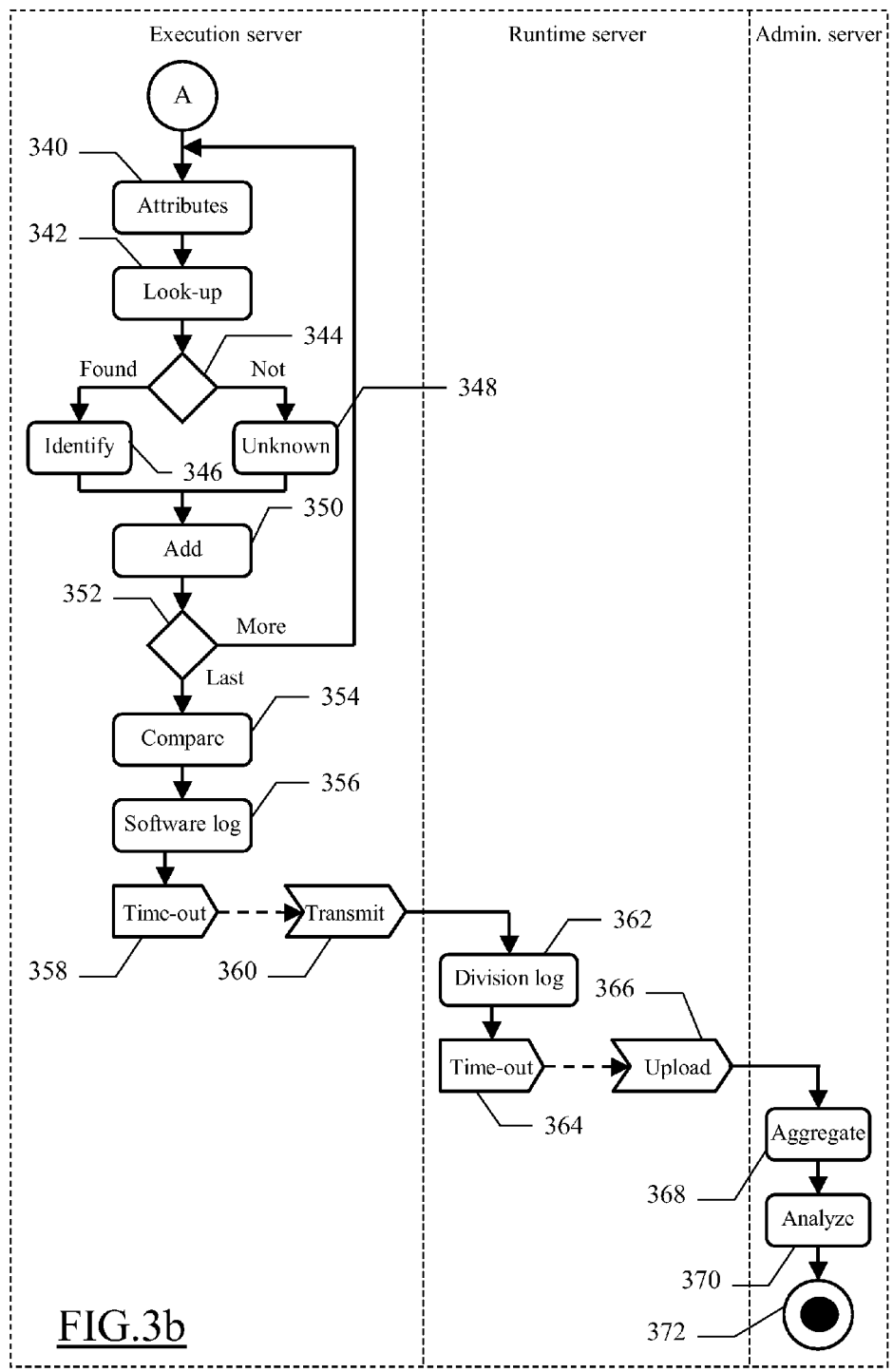

This information may be used to charge a prescribed licensing fee for any usage of the known software products (according to predefined rates for different processing powers, as specified by their conditions of use); for example, in the above-mentioned situation a low amount would be charged for each hour of use of the software product on the execution server 110 with the 1 low-end microprocessor, a higher amount would be charged for each hour of use on the other execution server 110 with the 1 high-end microprocessor, and a still higher amount would be charged for each hour of use on the same execution server 110 with the 2 high-end microprocessors. With reference now to FIGS. 3*a*-3*b*, the logic flow of an exemplary process that can be implemented in the above-described system (to meter the usage of the desired software products) is represented with a method 300. The method 300 begins at the black start circle 302 in the swim-lane of a generic execution server. The process descends into block 304 as soon as the execution server is turned on. In this phase, the licensing agent is invoked to estimate the processing power of the execution server. For this purpose, the licensing agent at block 306 detects the number of microprocessors that are available to the execution server (by means of a corresponding API of the operating system).

The licensing agent then executes the benchmark program and determines its execution time. This result may be achieved in two different manners, which are represented by the flow of activity that forks at the synchronization bar 308 into alternative branches. Particularly, an implementation involves the execution of the branch formed by the blocks 310-316, whereas another implementation involves the execution of the branch formed by the blocks 318-320; the two branches joint at the further synchronization bar 322.

Considering now block 310, a system clock is sampled and recorded (by means of a corresponding API of the operating system). The benchmark program is then launched at block 312. As soon as the execution of the benchmark program ends (block 314), the system clock is sampled and recorded again. Passing to block 316, the execution time of the benchmark program is calculated by subtracting the first system clock (indicative of its starting time) from the second system clock (indicative of its ending time). The branch ends at the synchronization bar 322. In this case, the benchmark program must be non-interruptable, i.e., its execution on the (assigned) microprocessor cannot be suspended for serving different requests; as a result, the benchmark program has exclusive use of the microprocessor without competing with any other software program. Moreover, the benchmark program should execute a relatively high number of instructions (for example, at least some hundreds and preferably some thousands); as a result, the time spent for recording its starting time and ending time is negligible with respect to the execution time of the benchmark program (so that it does not adversely affect the accuracy of its determination). The above-described implementation is very simple and of general applicability.

Alternatively, the benchmark program is launched at block 318 as usual; in this case, the benchmark program executes as any other software programs (competing with them for the use of the microprocessors of the execution server). The method 300 continues to block 320 as soon as the execution of the benchmark program ends. In this phase, the licensing agent retrieves a processor time of a process that was used to execute the benchmark program (recorded by the operating system); for example, this result is achieved by invoking a corresponding API of the operating system or by accessing a dedicated log (such as the SMF records on the "z/OS"). It should be noted that the processor time indicates the time actually dedicated by the relevant microprocessor to the process, as distinct from the corresponding elapsed time during which the microprocessor has generally served other processes as well. The branch likewise ends at the synchronization bar 322. In this case, a very accurate calculation of the execution time is possible.

In both cases, the process now continues to block 324. In this phase, the measured execution time of the benchmark program (typically expressed in seconds) is divided by its number of instructions (known a priori); this provides the (estimated) operation rate of a generic microprocessor of the execution server (expressed in instructions per second). Proceeding to block 326, the total processing power of the execution server is calculated by multiplying the operation rate so obtained by the number of its microprocessors. The licensing agent adds this information (together with a corresponding time-stamp) to the hardware log at block 328.

The choice of running the benchmark program at the startup of the execution server ensures that it completes before the actual business workload is active thereon; this minimizes the impact of the operation on the performance of the execution server (especially when the benchmark program is non-interruptable and then takes exclusive use of a whole microprocessor).

In addition or in alternative, as soon as a predefined time out expires (for example, every 10-60 minutes) the process passes from block 330 to block 332; in this phase, the licensing agent detects the number of microprocessors of the execution server again. A test is now made at block 334 to determine whether the number of microprocessors has changed (since a last iteration of the operation). If so, the flow of activity continues to block 326, so as to recalculate the processing power of the execution server (according to the new number of microprocessors and their known operation rate). This feature makes it possible to trace the processing power of the execution server even when the corresponding hardware configuration can be updated without stopping its operation; however, the choice of performing the operation only in response to the detection of any change maintains acceptable the impact on the performance of the execution server.

In any case, once the operation has been terminated the method 300 passes from block 328 to block 336; the same point is also reached from block 334 directly when the number of microprocessors is unchanged. As soon as another time-out expires (for example, every 1-10 minutes), the licensing agent at block 338 retrieves a list of processes that are active on the execution server (by means of a corresponding API of the operating system). A loop is then performed for each process (starting from the first one); the loop begins at block 340 wherein the licensing agent accesses the corresponding executable module (identified by the name returned from the operating system), so as to retrieve its further attributes (i.e., the size and checksum in the example at issue). Continuing to block 342, the licensing agent compares the size and the checksum of the executable module with the ones specified in the software catalogue for its name (if any). When the attributes of the executable module match an entry in the software catalogue (decision block 344), the corresponding software product is identified at block 346. Conversely, the software product is set as unknown at block 348 (saving any available information, such as the name of the executable module). In both cases, the information so obtained is added to the list of software products that are currently running on the execution server at block 350. A test is then made at block 352 to determine whether all the processes have been analyzed. If not, the method returns to block 340 to repeat the same operations for a next process. Conversely, the loop is exit descending into block 354; in this phase, the software monitor compares the list of running software products (received from the licensing agent) with the content of the runtime table, so as to detect the software products that have been started or stopped (since the last iteration of the operation). Continuing to block 356, the information so obtained (together with a corresponding time-stamp) is added to the software log, and the runtime table is updated accordingly.

As soon as another time-out expires at block 358 (for example, every 6-24 hours), the process enters block 360; in this phase, the licensing manager extracts the software execution information (from the software log) and the hardware capacity information (from the hardware log); this information is then transmitted to the runtime server (together with the identifier of the execution server). In response thereto, the runtime server at block 362 saves the received information into the division log.

In response to the expiration of a different time-out at block 364 (for example, at the end of every day), the licensing manager at block 366 uploads the information available in the division log onto the administration server. Moving to the swim-lane of the administration server, a new usage report can be generated at block 368 by aggregating the received information. The usage report so obtained is then analyzed at block 370 (for example, to charge the applicable licensing fees). The method then ends at the concentric white/black stop circles 372.

Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, similar considerations apply if the system has a different architecture or includes equivalent units. Moreover, each computer may have another structure or may include similar elements (such as cache memories temporarily storing the programs or parts thereof to reduce the accesses to the mass memory during execution); in any case, it is possible to replace the computer with any code execution entity (such as a PDA, a mobile phone, and the like).

It should be readily apparent that the implementation of the present invention is not limited to any specific licensing application and/or technique for identifying the software products that are running on the execution servers; for example, it is possible to detect the invocation of any new software product (or any equivalent digitally encoded product, such as an electronic book) by intercepting the launching of the corresponding process (for example, using a kernel hooking technique). Likewise, it is possible to measure the number of invocations of the software products (instead of the length of the corresponding running periods), or more generally any other index indicative of their running. In addition, the available information may be simply used to verify compliance with applicable conditions of use, or more generally for whatever management purpose.

The proposed algorithms for determining the execution time of the benchmark program (and then the processing power) are merely illustrative. For example, nothing prevents the implementation of all the operations by the benchmark program directly; alternatively, it is possible to have a distinct agent that estimates the processing power and transmits it to the runtime server independently.

Without departing from the principles of the invention, the benchmark program may execute any other instructions (even written in a different language).

Alternatively, it is possible to launch the benchmark program only at the startup of the execution server (for example, when warm changes are not possible); vice-versa, the launching of the benchmark program at the startup of the execution server may be avoided when its hardware configuration is continuously monitored. In any case, different scheduling policies for the execution of the benchmark program are within the scope of the invention (for example, simply periodically).

Even though the proposed solution has been specifically designed for use on multiprocessor computers that are split into a number of logical partitions, this is not to be interpreted in a limitative manner. For example, nothing prevents the application of the same solution on computers with single microprocessors. Moreover, the solution according to the present invention lends itself to be used on virtual machines, or more generally on any other logical guest machine implemented on a physical host machine. In any case, the same technique finds equal application on real computers without any virtualization layer.

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (having similar or additional steps, even in a different order). In any case, the program may take any form suitable to be used by or in connection with any data processing system, such as external or resident software, firmware, or microcode (either in object code or in source code). Moreover, the program may be provided on any computer-usable medium; the medium can be any element suitable to contain, store, communicate, propagate, or transfer the program. Examples of such medium are fixed disks (where the program can be pre-loaded), removable disks, tapes, cards, wires, fibers, wireless connections, networks, broadcast waves, and the like; for example, the medium may be of the electronic, magnetic, optical, electromagnetic, infrared, or semiconductor type.

In any case, the solution according to the present invention lends itself to be carried out with a hardware structure (for example, integrated in a chip of semiconductor material), or with a combination of software and hardware.

The invention claimed is:

1. A method comprising:
launching execution of a benchmark program in response to a startup of a system, wherein the benchmark program is non-interruptable;
executing the benchmark program on the system, wherein the benchmark program performs a predetermined number of instructions;
determining an indication of an execution time of the benchmark program;
calculating a processing power of the system based on the execution time and the number of instructions, the processing power being calculated in units of instructions per second;
measuring a running index to determine runtime information indicative of a running of each one of a set of predefined software products on the system;
determining usage of each software product of the set of predefined software products on the system according to the running index and the processing power corresponding to each software product; and
calculating licensing fees for the set of predefined software products on the system based on said usage of each software product;
wherein the processing power corresponding to each software product is the processing power of one or more processors of the system that execute said each software product during the usage.

2. The method according to claim 1, wherein the determining the indication of the execution time comprises:
recording a starting time of the benchmark program, wherein the starting time of the benchmark program occurs on the system after system bootup before execution of any other application programs;
recording an ending time of the benchmark program; and
calculating the execution time according to the difference between the ending time and the starting time.

3. The method according to claim 1, wherein a processor time dedicated by a processor of the system to each process completed on the system is recorded, and wherein the determining the indication of the execution time comprises:
setting the execution time according to the processor time of a benchmark process used to execute the benchmark program.

4. The method according to claim 1, wherein the benchmark program includes a set of instructions in a low-level language; and wherein the benchmark program is single threaded.

5. The method according to claim 1, wherein the system includes a number of processors higher than one and the benchmark program is adapted to be executed on a single one of the processors, and wherein the benchmark program is adapted to initially be executed on a single one of the processors and wherein the processors are identical, the method further comprising:

determining the number of processors; and updating the processing power according to a multiplicative factor based on the number of processors.

6. The method according to claim 5, further comprising:

detecting a change in the number of processors; and performing said updating of the processing power in response to the detection of the change.

7. The method according to claim 1, wherein the system includes a physical host machine implementing a plurality of logical guest machines, and wherein the executing the benchmark program, the determining the indication of the execution time, and the calculating the processing power are carried out on a selected one the guest machines.

8. A computer program product comprising:

a non-transitory computer-usable medium embodying a computer program, wherein the computer program upon being executed on a data processing system causes a system to:

launch execution of a benchmark program in response to a startup of the system, wherein the benchmark program is non-interruptable;

execute the benchmark program on the system, wherein the benchmark program performs a predetermined number of instructions;

determine an indication of an execution time of the benchmark program;

calculate a processing power of the system based on the execution time and the number of instructions, the processing power being calculated in units of instructions per second;

measure a running index to determine runtime information indicative of a running of each one of a set of predefined software products on the system; and determine usage of each software product of the set of predefined software products on the system according to the running index and the processing power corresponding to each software product;

calculate licensing fees for the set of predefined software products on the system based on said usage of each software product;

wherein the processing power corresponding to each software product is the processing power of one or more processors of the system that execute said each software product during the usage.

9. A system comprising:

a plurality of identical processors;

an agent configured to:

launching execution of a benchmark program in response to a startup of the system, wherein the benchmark program is non-interruptable;

executing the benchmark program on a single one of the plurality of identical processors, wherein the benchmark program:

performs a predetermined number of instructions;

determines an indication of an execution time of the benchmark program; and calculates a processing power of the system based on the execution time and the number of instructions, the processing power being calculated in units of instructions per second; and a monitoring program configured to:

measuring a running index to determine runtime information indicative of a running of each one of a set of predefined software products on the system; and determining usage of each software product of the set of predefined software products on the system according to the running index and the processing power corresponding to each software product; and calculating licensing fees for the set of predefined software products on the system based on said usage of each software product;

wherein the processing power corresponding to each software product is the processing power of one or more processors of the system that execute said each software product during the usage.

10. The computer program product according to claim 8, wherein the determining the indication of the execution time comprises:

recording a starting time of the benchmark program, wherein the starting time of the benchmark program occurs on the system after system bootup before execution of any other application programs;

recording an ending time of the benchmark program; and calculating the execution time according to the difference between the ending time and the starting time.

11. The computer program product according to claim 8, wherein a processor time dedicated by a processor of the system to each process completed on the system is recorded, and wherein the determining the indication of the execution time comprises:

setting the execution time according to the processor time of a benchmark process used to execute the benchmark program.

12. The computer program product according to claim 8, wherein the benchmark program includes a set of instructions in a low-level language; and wherein the benchmark program is single threaded.

13. The system according to claim 9, wherein the determining the indication of the execution time comprises:

recording a starting time of the benchmark program, wherein the starting time of the benchmark program occurs on the system after system bootup before execution of any other application programs;

recording an ending time of the benchmark program; and calculating the execution time according to the difference between the ending time and the starting time.

14. The system according to claim 9, wherein a processor time dedicated by a processor of the system to each process completed on the system is recorded, and wherein the determining the indication of the execution time comprises:

setting the execution time according to the processor time of a benchmark process used to execute the benchmark program.

15. The system according to claim 9, wherein the benchmark program includes a set of instructions in a low-level language; and wherein the benchmark program is single threaded.

16. The computer program product according to claim 9, wherein the system includes a number of processors higher than one and the benchmark program is adapted to be executed on a single one of the processors, and wherein the benchmark program is adapted to initially be executed on a single one of the processors and wherein the processors are identical, wherein the computer program upon being executed on the data processing system causes a system to:
- determine the number of processors; and
- update the processing power according to a multiplicative factor based on the number of processors.

17. The system according to claim 9, wherein the benchmark program is adapted to initially be executed on a single one of the processors and wherein the processors are identical, wherein the agent performs activities further comprising:
- determining the number of processors; and
- updating the processing power according to a multiplicative factor based on the number of processors.

18. The method according to claim 1, wherein the running index is used in licensing calculations for each one of the set of predefined software products.

19. The computer program product according to claim 8, wherein the running index is used in licensing calculations for each one of the set of predefined software products.

20. The system according to claim 9, wherein the running index is used in licensing calculations for each one of the set of predefined software products.

21. The method according to claim 1, wherein said processing power of the system is calculated by dividing the execution time by the predetermined number of instructions; and
- wherein said predetermined number of instructions is an arithmetic operation performed the predetermined number of times.

22. The computer program product according to claim 8, wherein said processing power of the system is calculated by dividing the execution time by the predetermined number of instructions; and
- wherein said predetermined number of instructions is an arithmetic operation performed the predetermined number of times.

23. The system according to claim 9, wherein said processing power of the system is calculated by dividing the execution time by the predetermined number of instructions; and
- wherein said predetermined number of instructions is an arithmetic operation performed the predetermined number of times.

* * * * *